US007574407B2

(12) United States Patent
Carro et al.

(10) Patent No.: US 7,574,407 B2
(45) Date of Patent: Aug. 11, 2009

(54) SYSTEM AND METHOD FOR SELECTING, ORDERING AND ACCESSING COPYRIGHTED INFORMATION FROM PHYSICAL DOCUMENTS

(75) Inventors: Fernando Incertis Carro, Valencia (ES); Jose Maria Varona Barbero, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 10/530,535

(22) PCT Filed: Jul. 23, 2003

(86) PCT No.: PCT/EP03/09309

§ 371 (c)(1), (2), (4) Date: Apr. 6, 2005

(87) PCT Pub. No.: WO2004/034280

PCT Pub. Date: Apr. 22, 2004

(65) Prior Publication Data

US 2006/0167754 A1     Jul. 27, 2006

(30) Foreign Application Priority Data

Oct. 10, 2002   (EP) .................................. 02368109

(51) Int. Cl.
*H04K 1/00* (2006.01)
*H04L 9/00* (2006.01)
(52) U.S. Cl. ................. 705/59; 705/57; 726/9
(58) Field of Classification Search ............... 705/51–79
See application file for complete search history.

(56) References Cited

U.S. PATENT DOCUMENTS 3,760,360 A     9/1973   Reynolds et al.

(Continued)

FOREIGN PATENT DOCUMENTS

EP     1 186 986     3/2002

(Continued)

OTHER PUBLICATIONS

Newman et al., "A Desk Supporting Computer-Based Interaction With Paper Documents", Proceedings of the ACM Conference on Human Factors in Computer Systems, Monterey, May 1992, 6 pg.s.

(Continued)

*Primary Examiner*—Andrew J. Fischer
*Assistant Examiner*—Shahid Kamal
(74) *Attorney, Agent, or Firm*—Schmeiser, Olsen & Watts; William H. Steinberg

(57) ABSTRACT

A method for processing edited objects associated with a physical document, for use in a user workstation by a user. An edited object is identified in an edited objects table from being associated with an item that has been selected from a page of the physical document through use a point pressed on a touch foil aligned over or under the page. It is ascertained that the user does not have a license to use and/or copy the edited object. Information concerning the edited object is received by the user workstation from an edited objects server and then displayed on the user workstation. The user workstation receives the edited object with the license from the edited objects server, stores the edited object, and updates an edited object path column in the edited objects table in the user workstation with a file path for accessing the stored edited object.

3 Claims, 16 Drawing Sheets

U.S. PATENT DOCUMENTS

| | | | |
|---|---|---|---|
| 5,957,695 | A | 9/1999 | Redford et al. |
| 6,167,382 | A | 12/2000 | Sparks et al. |
| 6,185,683 | B1 | 2/2001 | Ginter et al. |
| 6,282,539 | B1 | 8/2001 | Luca |
| 6,322,262 | B1 | 11/2001 | Trosterud |
| 6,343,138 | B1 | 1/2002 | Rhoads |
| 6,343,273 | B1 | 1/2002 | Nahan et al. |
| 6,343,283 | B1 | 1/2002 | Saito et al. |
| 6,389,541 | B1 * | 5/2002 | Patterson ............... 726/9 |
| 7,472,338 | B2 | 12/2008 | Carro |
| 2003/0130952 | A1 * | 7/2003 | Bell et al. ............. 705/51 |
| 2007/0228177 | A1 * | 10/2007 | Lapstun et al. ....... 235/472.03 |

FOREIGN PATENT DOCUMENTS

| | | |
|---|---|---|
| JP | PUPA2002091827 | 3/2002 |
| JP | PUPA2002099743 | 4/2002 |
| WO | WO 98 38761 | 9/1998 |
| WO | WO 00 72460 | 11/2000 |
| WO | WO 00 73981 | 12/2000 |
| WO | WO 01 77795 | 10/2001 |

OTHER PUBLICATIONS

Fernando Incertis Carro, "Light pen to use with a transparent electroluminiscent display"; Nov. 30, 2002; 4 pgs.

Robert D. Harding, Computer Interactive Texts, Proceedings of the Fourth ICTCM, Addison-Wesley, 1993, pp. 132-138.

* cited by examiner

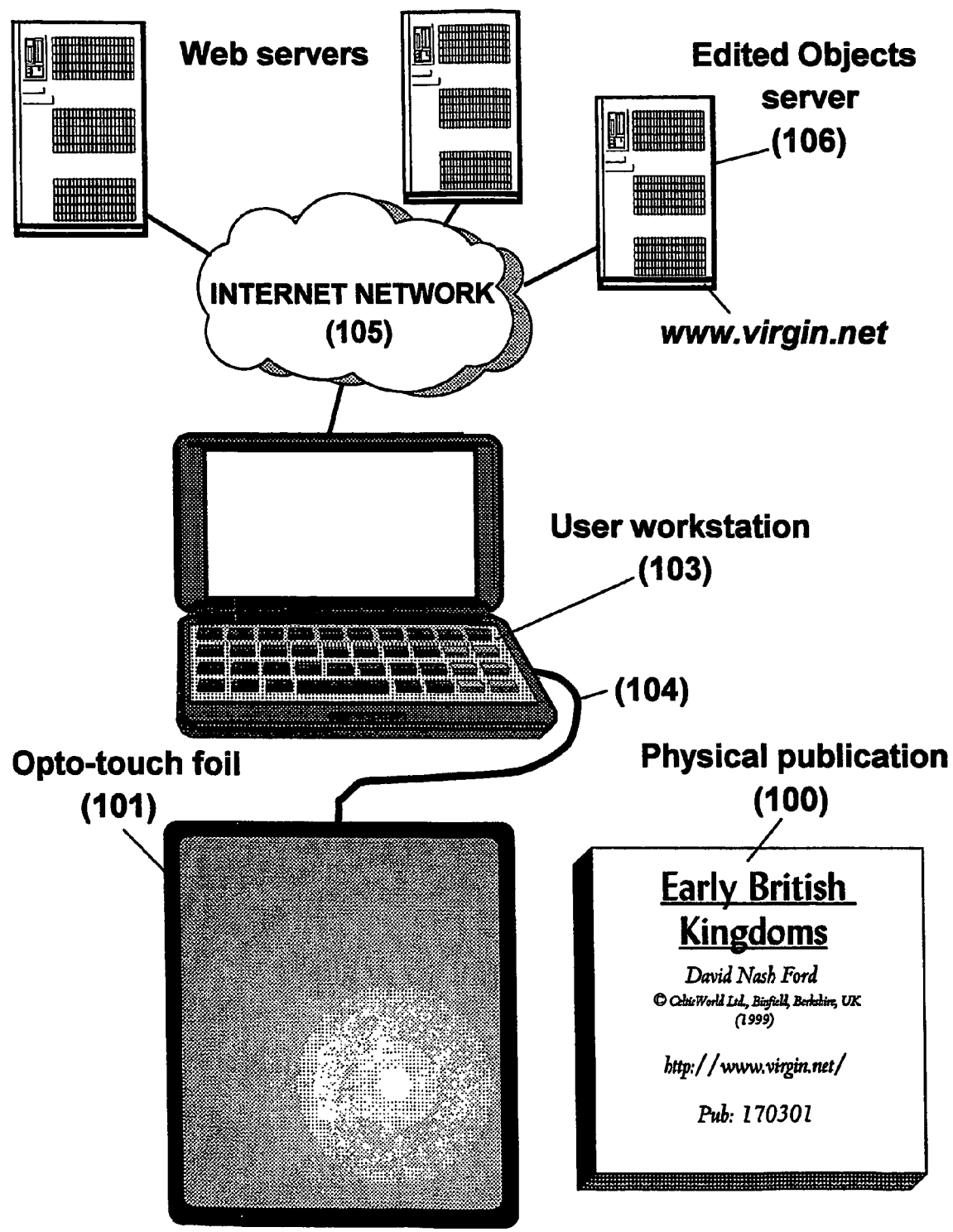
Fig. 1: Main components of the invention

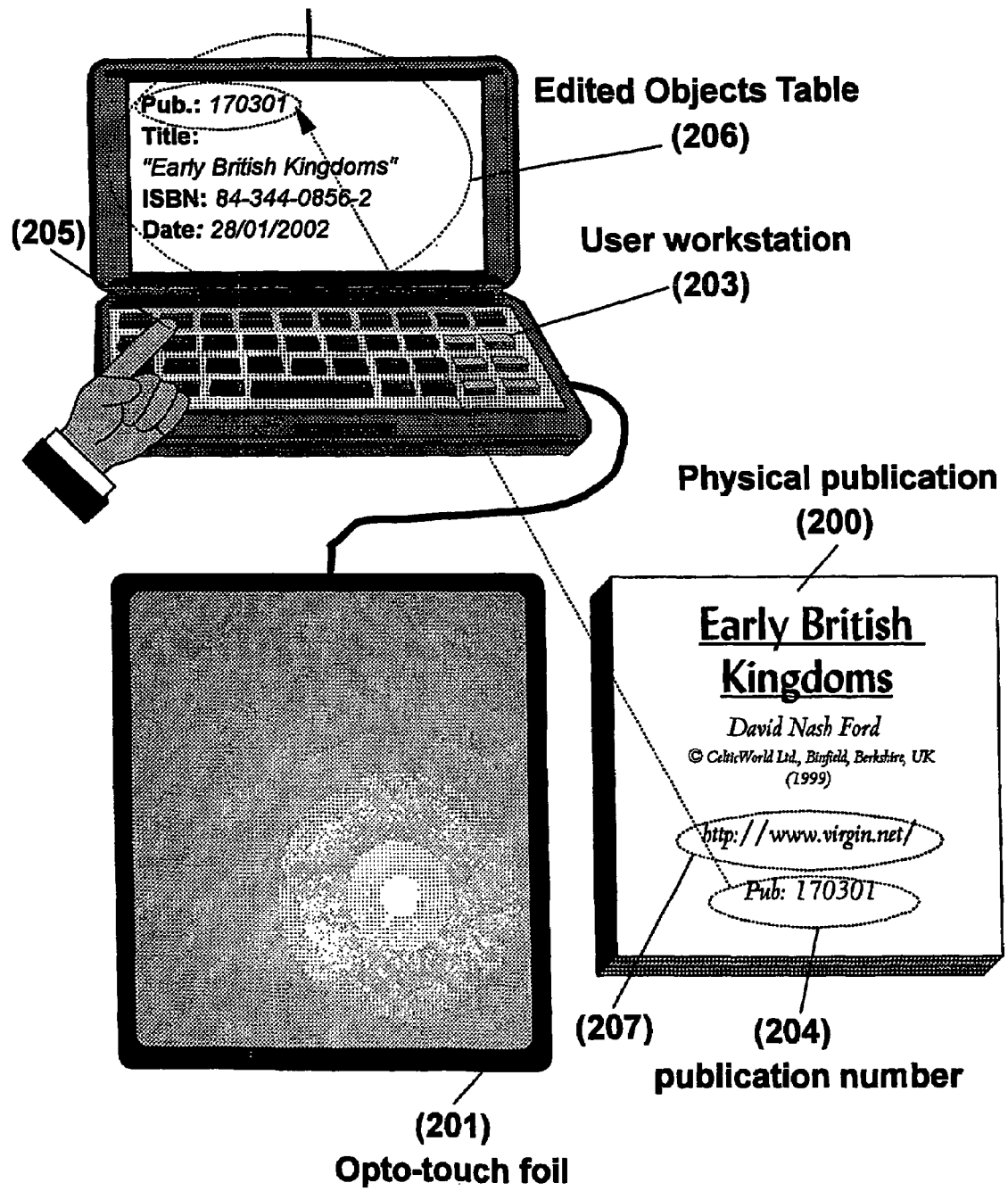
Fig. 2: The user enters the publication number and accesses the associated Edited Objects Table (300)

Edited Objects server: www.virgin.net — (302)    (301)
Publication: 170301 — (303)
Title: "Early British Kingdoms" — (304)
Author: David Nash Ford of Binfield, Berkshire, UK — (305)
Date: 28 / 01 / 1999 — (306)
ISBN: 84-344-0856-2 — (307)

Pg: 1

| Item position | Item Name | Edited Object Path |
|---|---|---|
| X= 45; Y=130 | Buellt & Gwerthrynion | c:\170301\1\buellt.html |
| X=205; Y=170 | Caer-Baddan (Bath) | Edited_object_not-found |
| X= 75; Y=190 | Caer-Celemion (Silchester) | c:\170301\1\vortigern.mpg |
| X=110; Y=255 | Ceredigion | c:\170301\1\ceredigion.doc |
| ........ | | |

Pg: 115  (320)

| Item position (311) | Item Name (312) | Edited Object Path (313) |
|---|---|---|
| X= 30; Y= 95 | Celtic gods | c:\170301\115\celtic-gods.html |
| X=255; Y=150 | Avalon | c:\170301\115\avalon.html |
| X=225; Y=160 | Modron | Edited_object_not-found |
| X=190; Y=230 | Arthur | Edited_object_not-found |
| ........ | | |

Pg: 139

| Item position | Item Name | Edited Object Path |
|---|---|---|
| X= 25; Y= 30 | St.Joseph of Arimathea | c:\170301\139\joseph.html |
| X= 80; Y= 75 | The Kings of Dumnonia | c:\170301\139\dummonia.doc |
| X=140; Y=135 | Eudaf Hen & Conan Meri | Edited_object_not-found |
| ........ | | |

(310)

Fig. 3: An Edited Objects Table for a publication

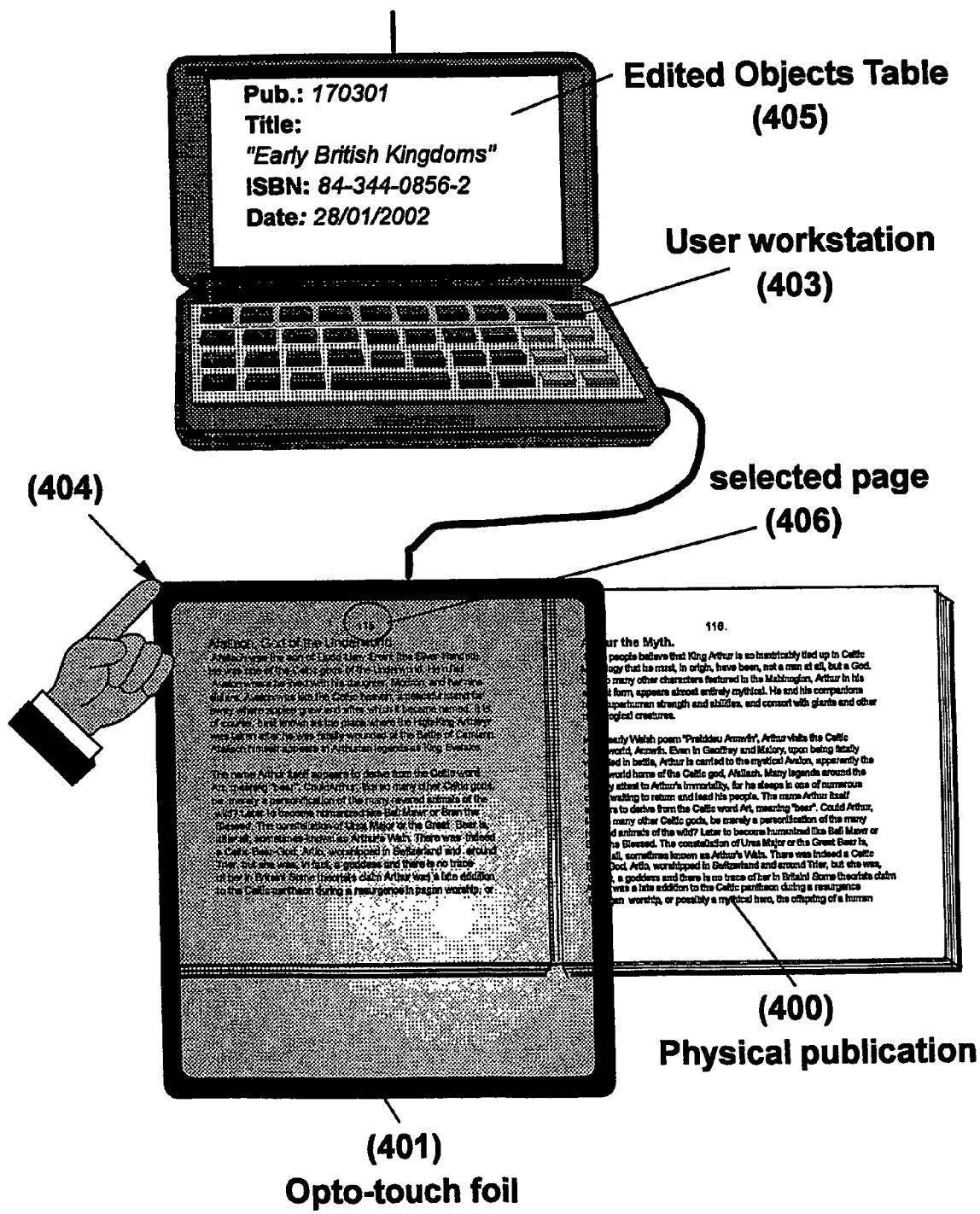
Fig. 4: The user selects a page of physical publication and places aligned transparent opto-touch foil over the selected page

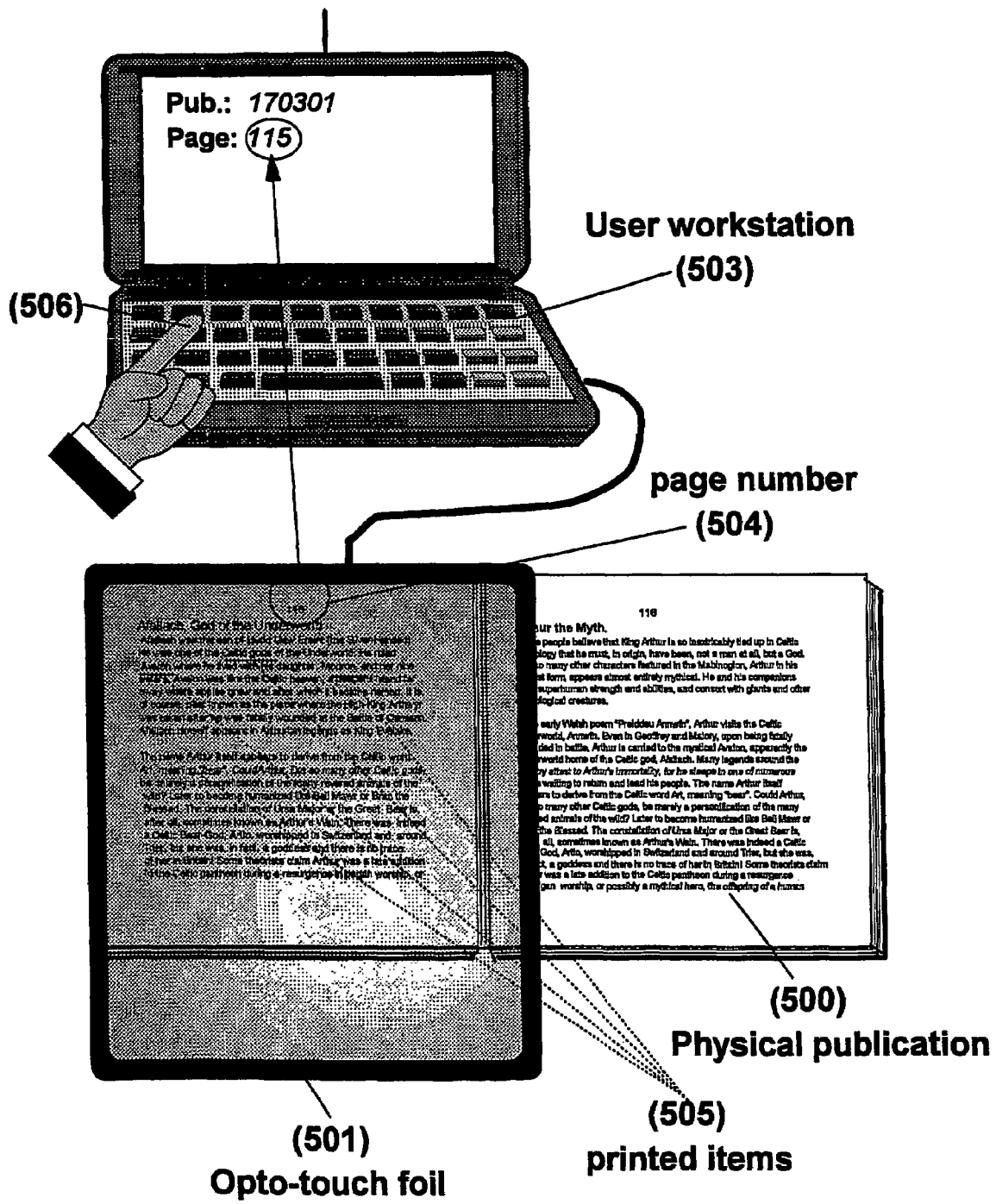
Fig. 5: The user enters the page number on the user workstation and some printed items of this page are highlighted by the opto-touch foil

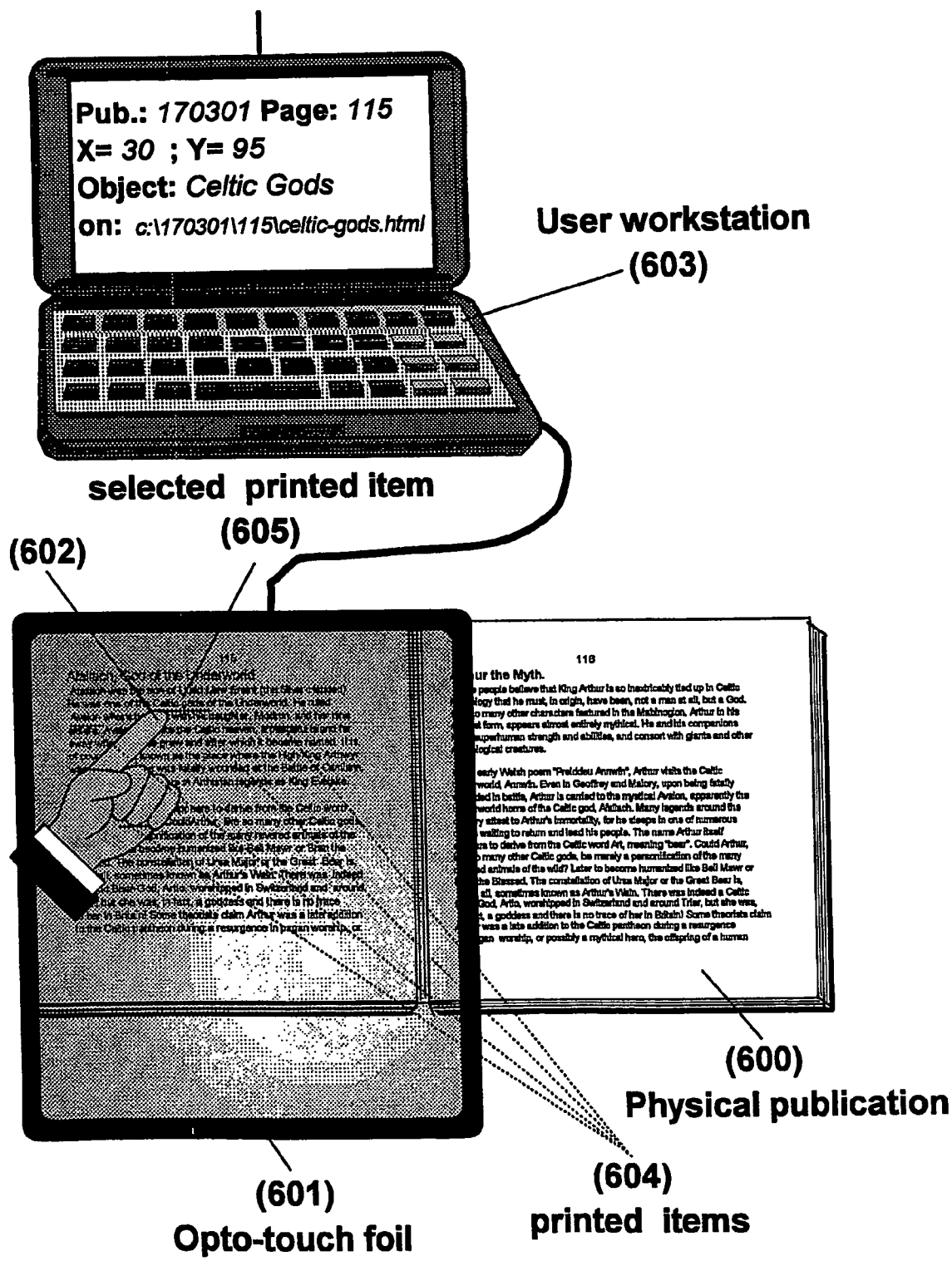
Fig. 6: The user touches the opto-touch foil over a selected printed item (e.g., Celtic gods)

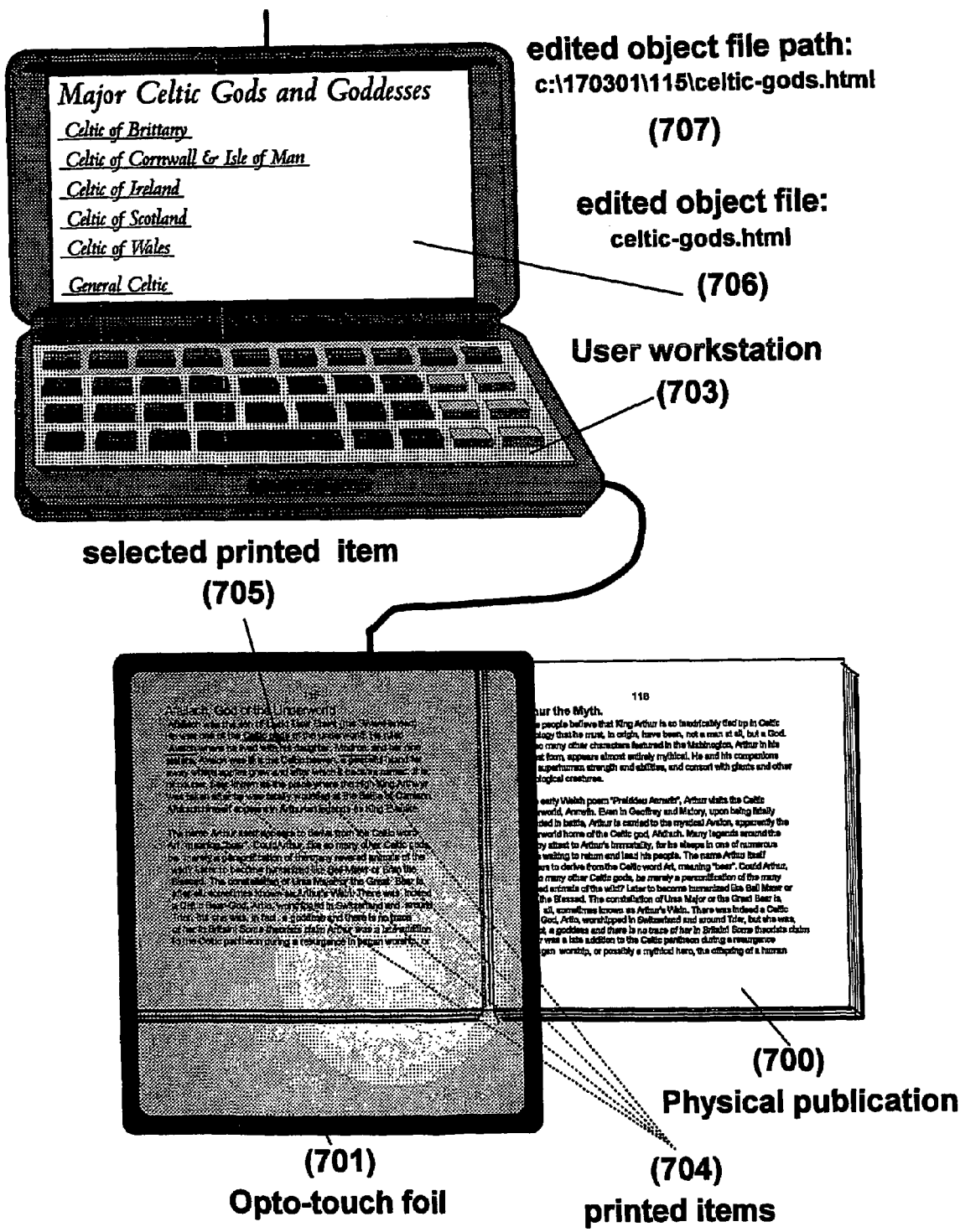
Fig. 7: When a license has been purchased by the user, the selected edited object is retrieved and displayed

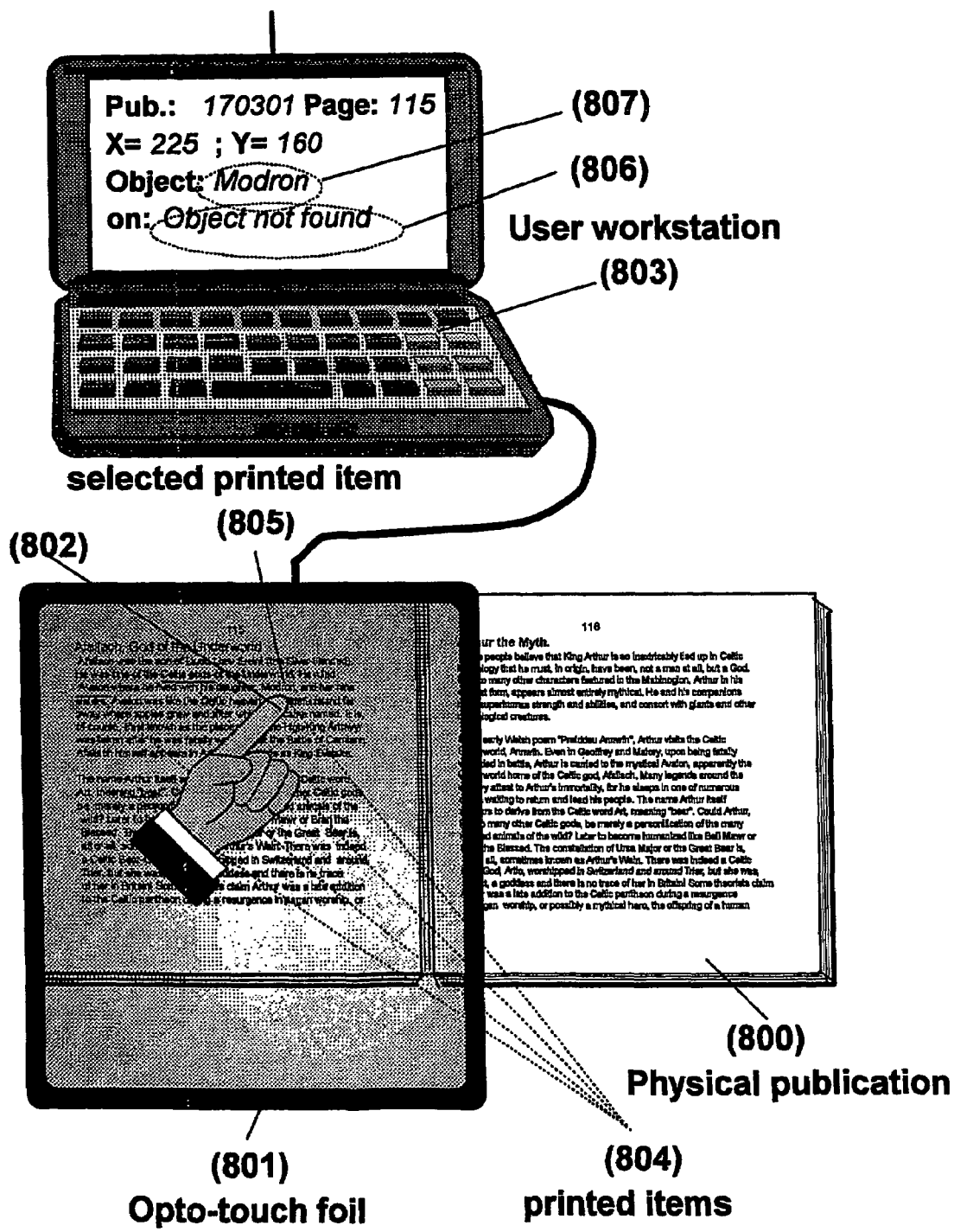
Fig. 8: The user touches the opto-touch foil over another item (e.g., Modron)

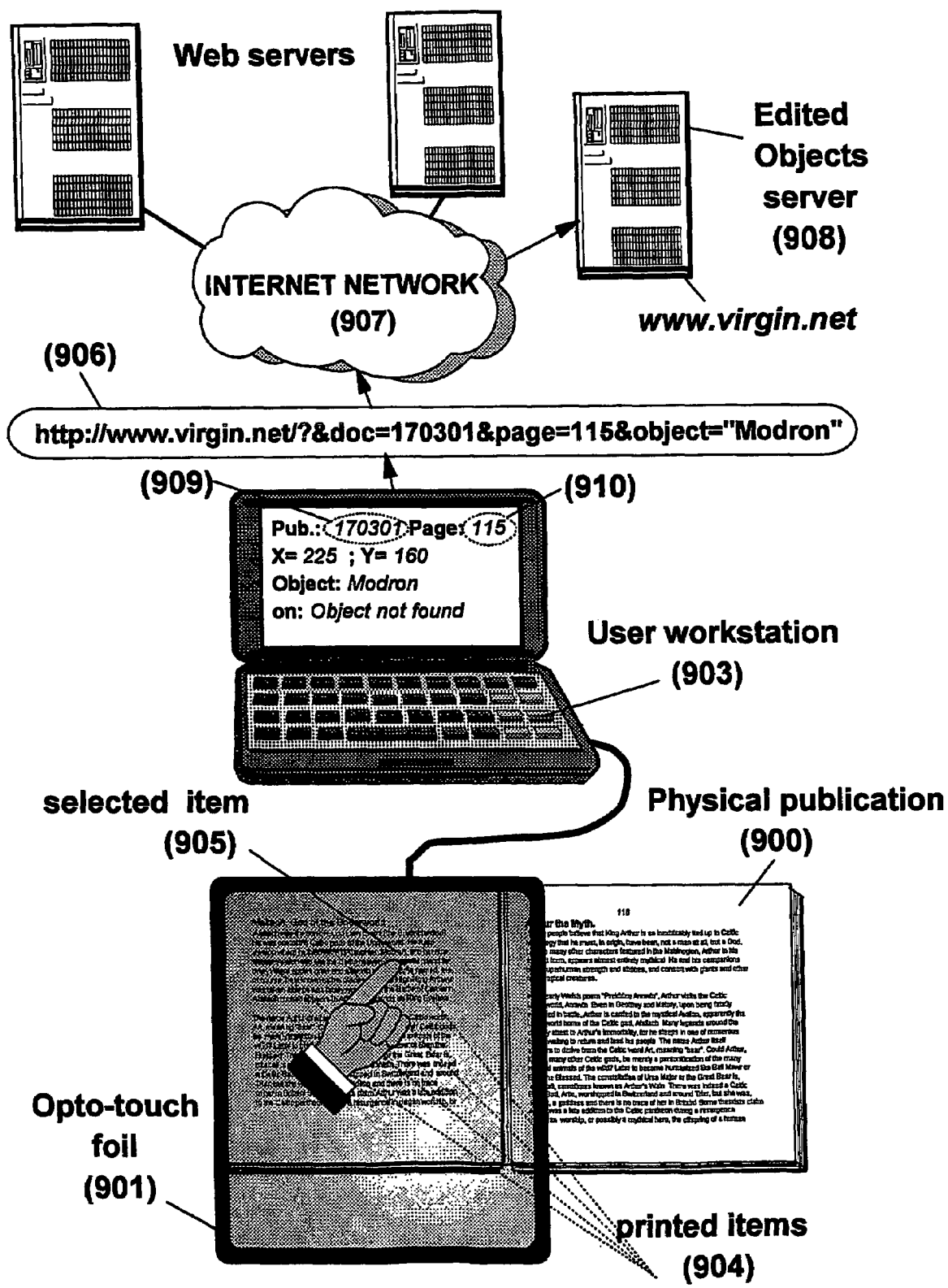
Fig. 9: If no licence has been purchased by the user, a request for information is sent to the Edited Objects server

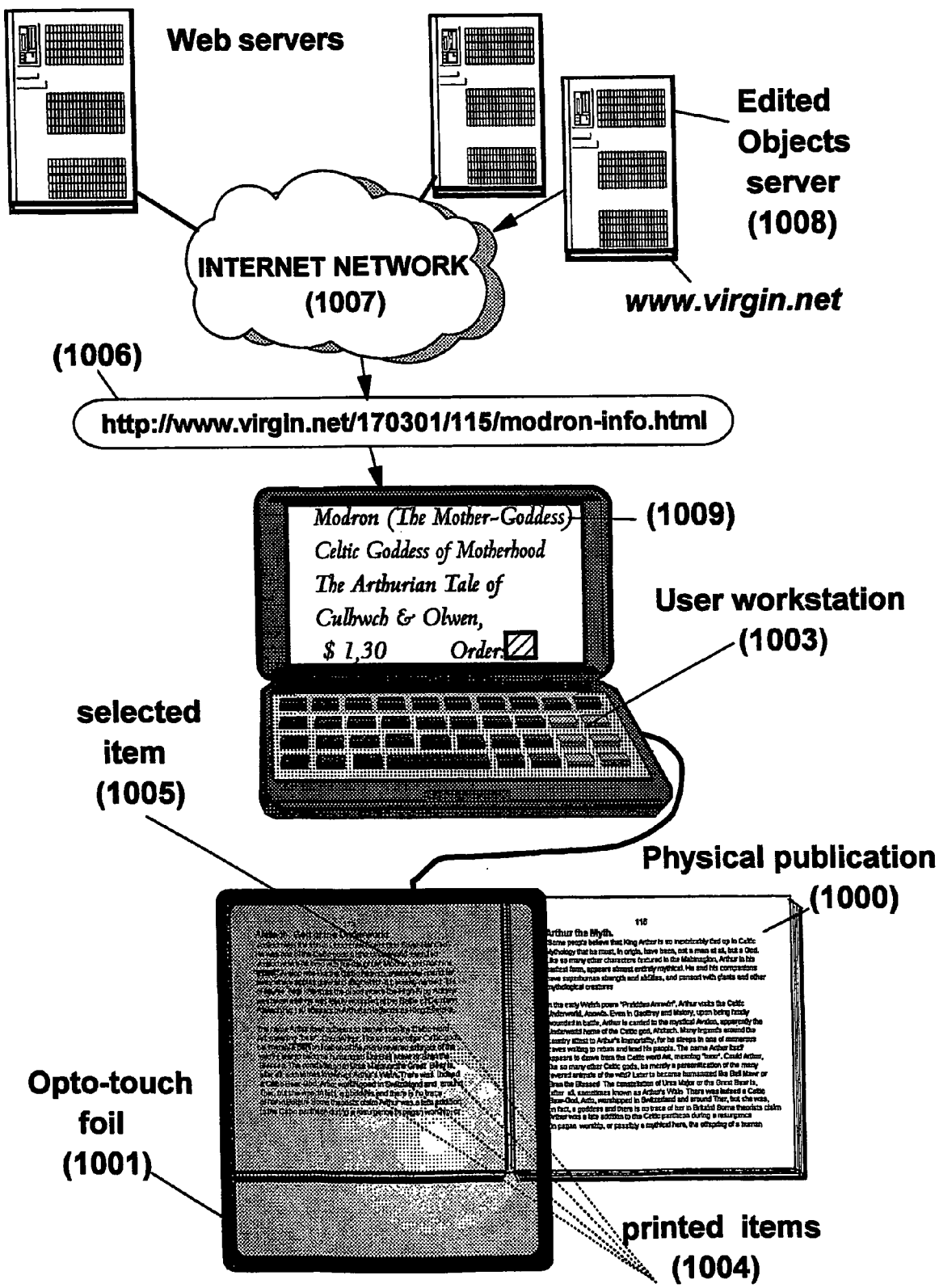
Fig. 10: A description of the edited object and ordering information are received from the Edited Objects server

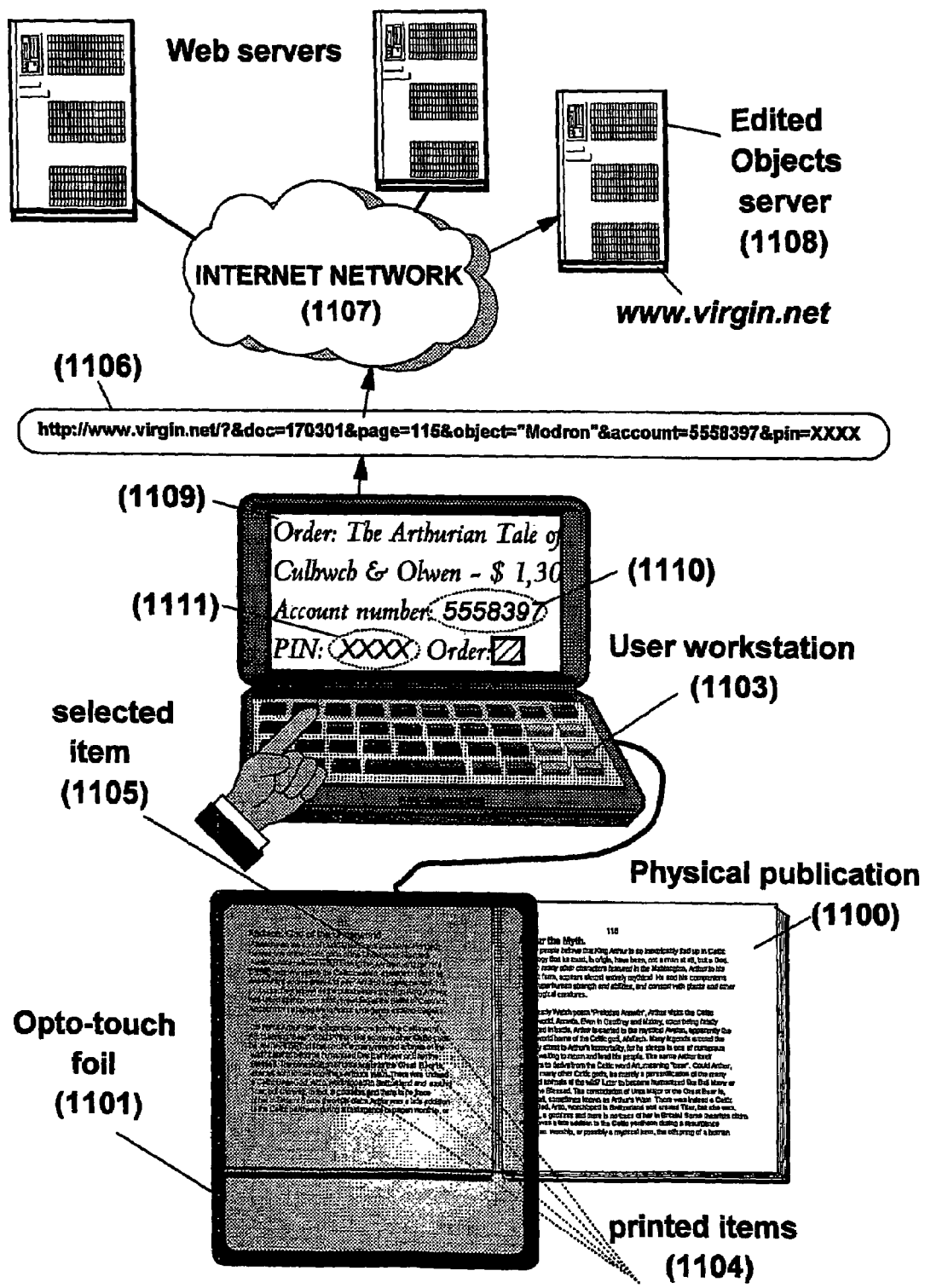
Fig. 11: The user places an order for the selected edited object

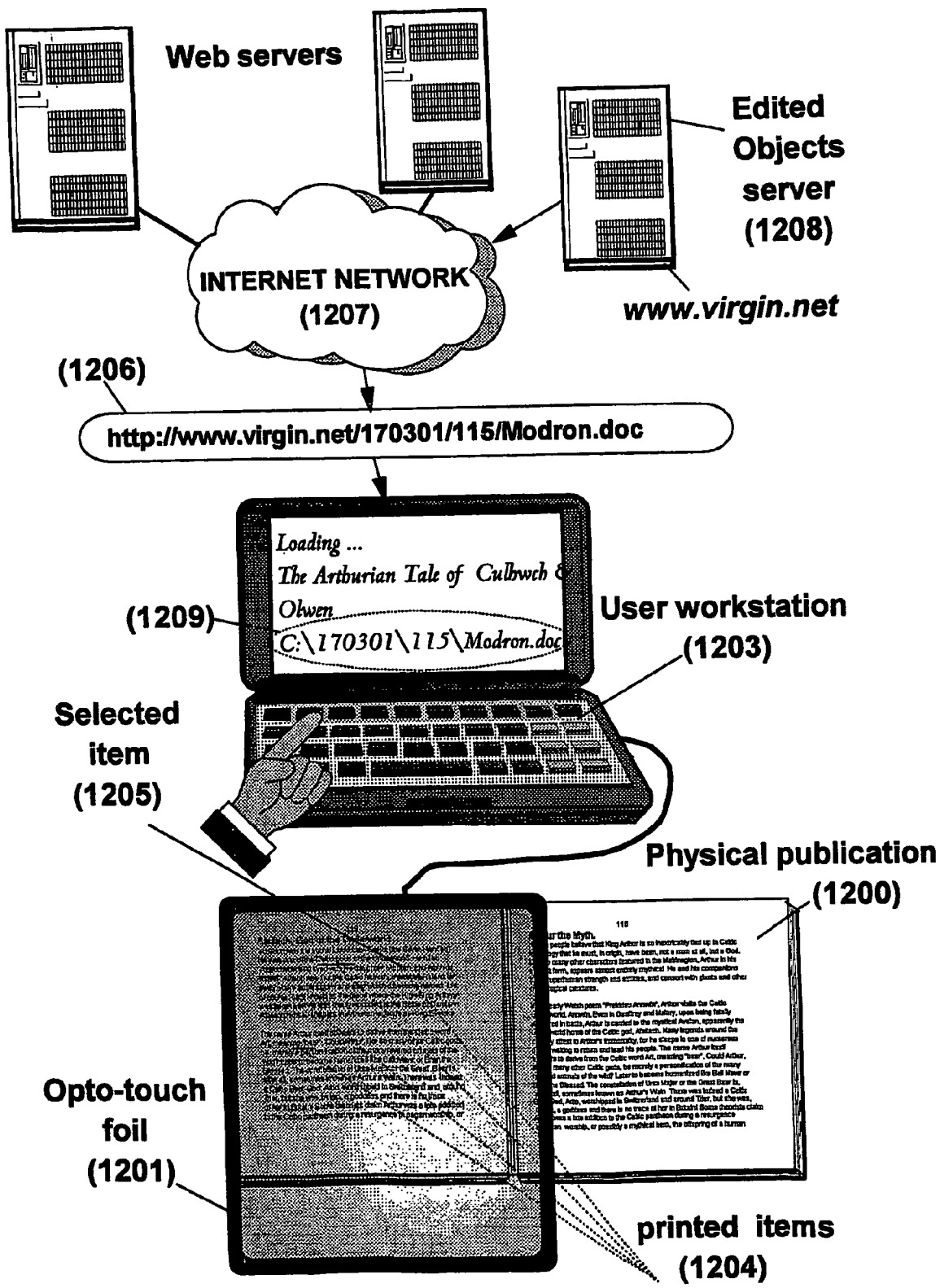
Fig. 12: The requested edited object is received from the Edited Objects server and is stored on the user workstation (1300)

Edited Objects server: www.virgin.net
Publication: 170301
Title: "Early British Kingdoms"
Author: David Nash Ford of Binfield, Berkshire, UK
Date: 28 / 01/ 1999
ISBN: 84-344-0856-2

Pg: 1

| Item position | Item Name | Edited Object Path |
|---|---|---|
| X= 45; Y=130 | Buellt & Gwerthrynion | c:\170301\1\buellt.html |
| X=205: Y=170 | Caer-Baddan (Bath) | Edited_object_not-found |
| X= 75; Y=190 | Caer-Celemion (Silchester) | c:\170301\1\vortigern.mpg |
| X=110; Y=255 | Ceredigion | c:\170301\1\ceredigion.doc |

........

Pg: 115

| Item position | Item Name | Edited Object Path |
|---|---|---|
| X= 30; Y= 95 | Celtic gods | c:\170301\115\celtic-gods.html |
| X=255; Y=150 | Avalon | c:\170301\115\avalon.html |
| X=225; Y=160 | Modron | c:\170301\115\Modron.doc |
| X=190; Y=230 | Arthur (1301) | (1302) Edited_object_not-found |

..........

Pg: 139

| Item position | Item Name | Edited Object Path |
|---|---|---|
| X= 25; Y= 30 | St.Joseph of Arimathea | c:\170301\139\joseph.html |
| X= 80; Y= 75 | The Kings of Dumnonia | c:\170301\139\dummonia.doc |
| X=140; Y=135 | Eudaf Hen & Conan Meri | Edited_object_not-found |

........

Fig. 13: The Edited Objects Table is updated with the file path to the received edited object

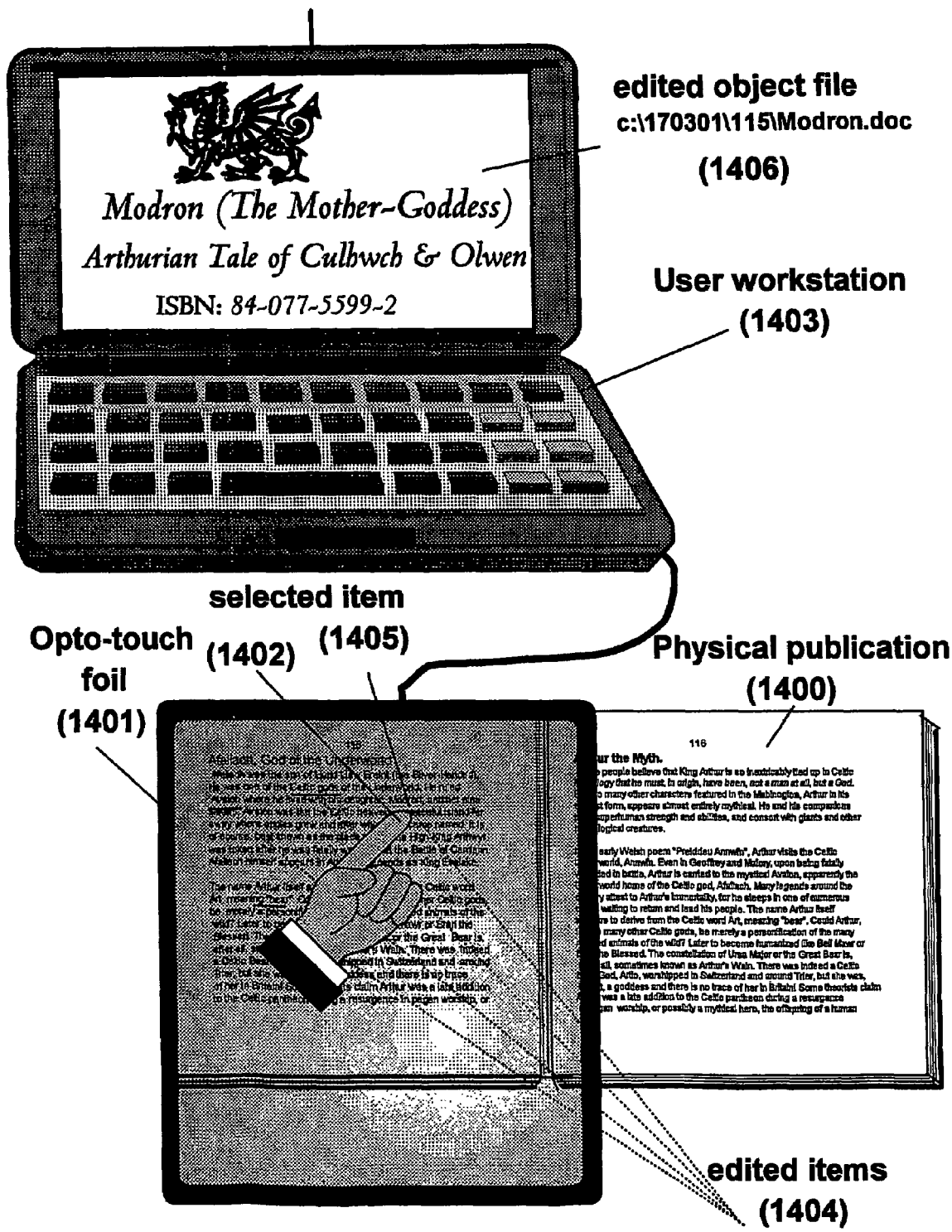
Fig. 14: When the user selects a printed item on the opto-touch foil, the associated edited object is retrieved and displayed on the user workstation

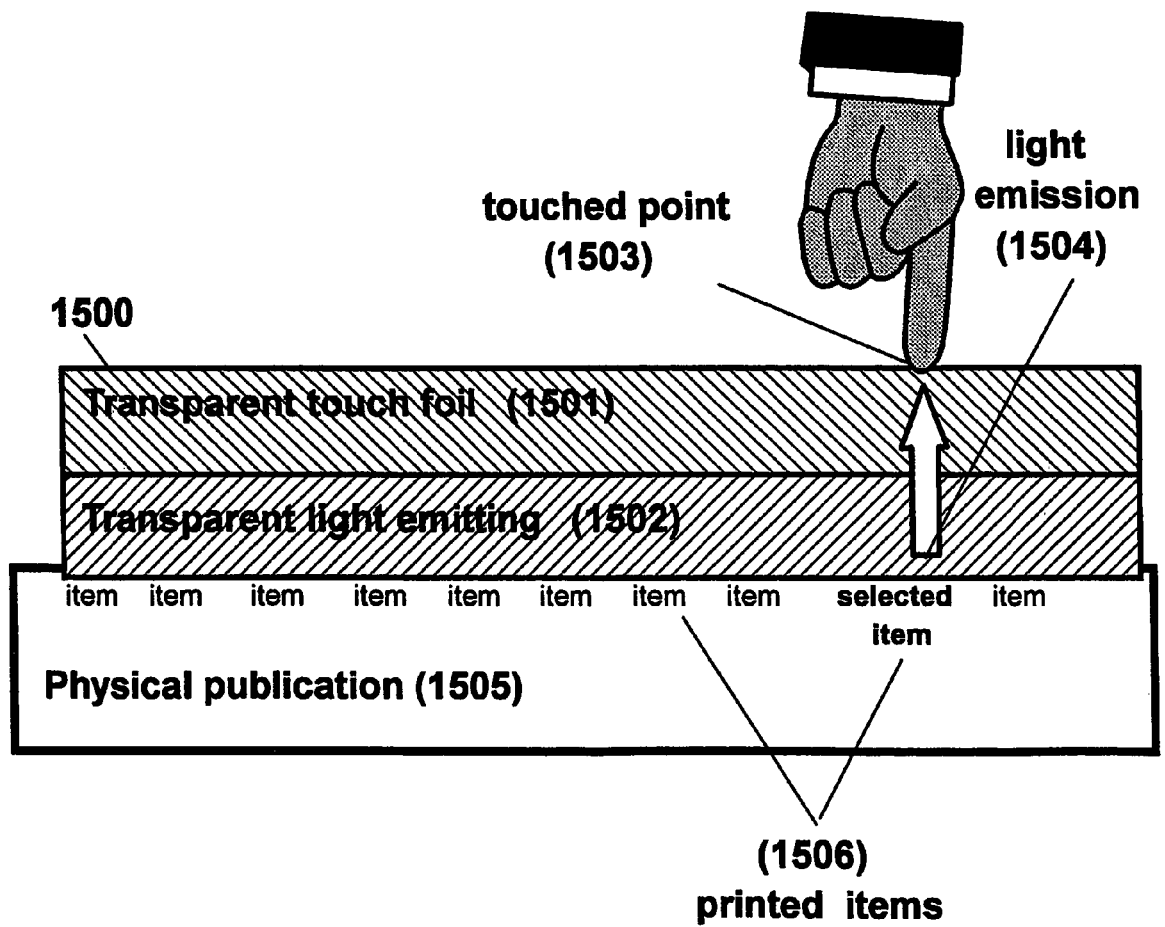
Fig. 15: Transparent opto-touch foil

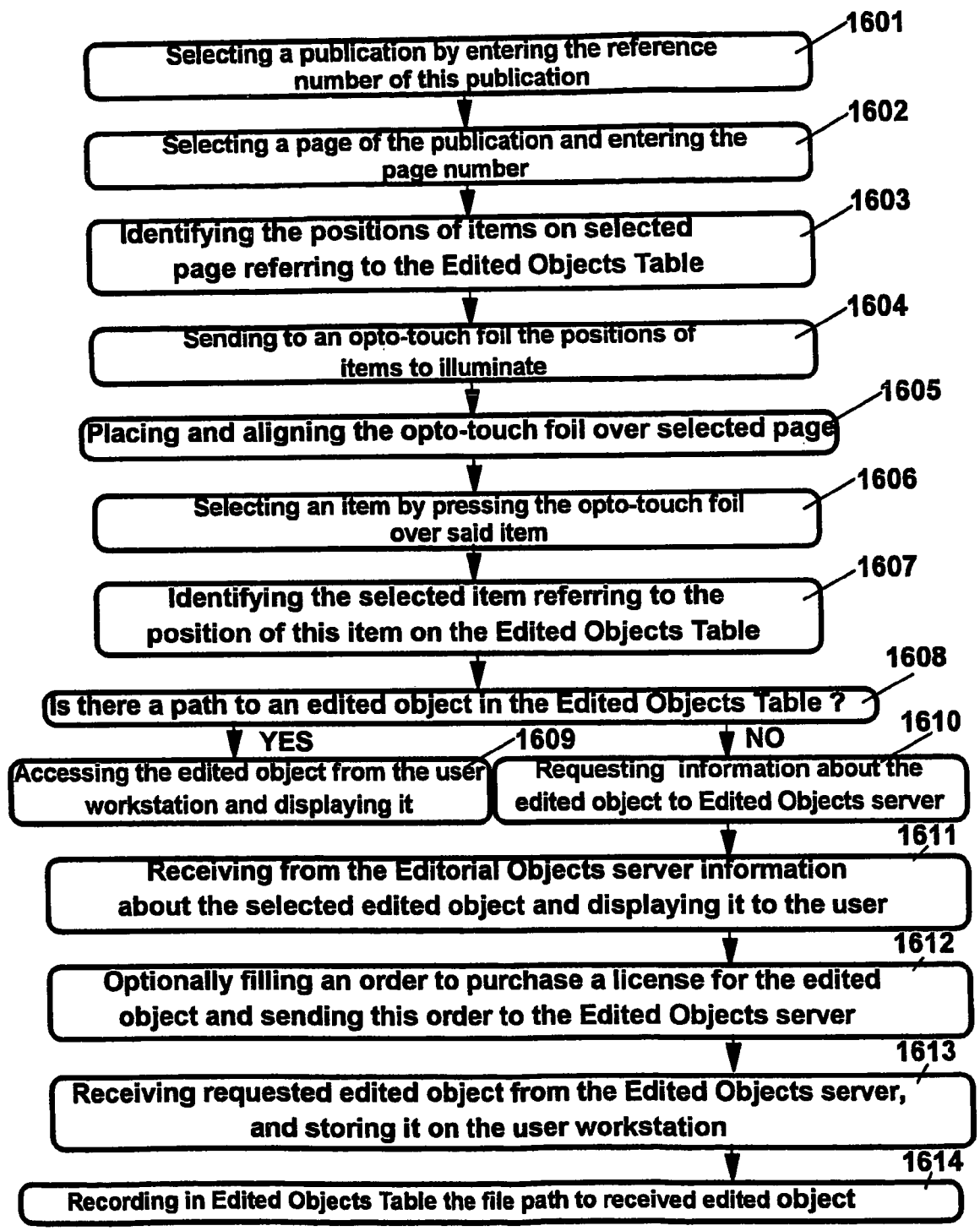
Fig. 16: Method for selecting, ordering, retrieving, accessing and displaying copyrighted edited objects from printed publications

SYSTEM AND METHOD FOR SELECTING, ORDERING AND ACCESSING COPYRIGHTED INFORMATION FROM PHYSICAL DOCUMENTS

FIELD OF THE INVENTION

The present invention generally relates to interactive hypermedia, electronic publishing systems and copyrights protection, and more particularly to a method, system and computer program for selecting, ordering, retrieving and displaying copyrighted information from physical documents such as printed publications or commercials.

BACKGROUND OF THE INVENTION

Many publishing products, including consumer books, newspapers and magazines, are directed to two markets. In fact publishers do not only sell a product to readers but they also sell the attention of these readers to advertisers or suppliers of information. For these publishers, the growth and the sharing of the advertising budgets is critical. The competitiveness of a large part of the industry can be defined in the ability to attract advertising revenues.

Publishing products such as newspapers, magazines and books are today mainly distributed to consumers either via thousands of retail outlets or via direct sales and subscriptions. Newspapers and magazines are generally sold directly to end users or through intermediaries and the distribution process does not usually involve retail distribution. Newspapers and magazines must be distributed very quickly, within a narrow time frame, or they become worthless. Delivery time from publisher to readers must be minimal to ensure early-morning readership, to reduce losses on distribution channels and to cut down wastage by limiting the number of returned (pulped) copies.

Consumer books are also subject to wastage due to the economics of printing, which entails an initial print based on an estimated demand.

One characteristic of the publishing industry is that most of the publications can be delivered in a digital form. In some cases the electronic or digital form has already supplanted the physical form (e.g., some journals and directories). In other cases, the electronic and physical form of a same publication are complementary (e.g., professional and business magazines and newspapers). In most cases, the physical form remains dominant (e.g., consumer magazines and books). In fact, with the exception of journals and directories which are generally the object of a subscription, most publishers are unable to create profitable digital products able to generate significant incomes.

In the publishing industry, the creation of value mainly is related to the printed form of the products. However, in the last few years the potential threat and opportunity represented by the electronic publishing (e-publishing) has been repeatedly examined. In fact, today, it is widely accepted that electronic publishing has a huge potential for publishers, particularly in the reduction of the distribution costs, in the opening of hitherto uneconomic geographical markets, and in the creation of new revenues via innovative products and services.

During these last years, specific technologies have been deployed within publishing companies to assess the changes in the value chain. Among these technologies, the most salient are:

Internet: this is, today, the technology the most widely deployed in the publishing industry (e.g., for content delivery).

E-commerce systems: electronic commerce allows to interact online with suppliers and customers in order to take orders and receive payments.

Content management systems: they enable the reuse and adaptation of published material and the creation of different formats (e.g. HTML, PDF, XML, etc) on multiple supports such as printed copy, the Web and CD-ROMs.

Rights management systems: they enable to record the rights and licenses related to the content of publications. In view of new emerging communication media such as Internet, copyrights become more and more important and complex to manage for authors and publishers. Rights management systems may incorporate encryption methods to prevent unauthorized copies.

The publishing industry shows a strong awareness of the potential of the e-commerce and e-business for optimizing editorial and production processes, sales and marketing, and ordering processes. Most publishers are looking for creating new products and services based on these new technologies to enhance their competitiveness.

Today, the widespread use of Internet and mobile communications offers a lot of new opportunities to publishers to combine electronic and printed media and to create "media-adaptive multimedia" products. The philosophy behind the concept of "media-adaptive multimedia" is the following: information must be conveyed to consumers in a form that can be adapted to their (multimedia) requirements. In fact, today there is a need to combine and integrate traditional printed products, digitally printed products, multimedia products, and electronic communications to satisfy the consumer requirements. Consequently, the joint usage of digital objects and printed material appears as an important issue for the publishing industry in general.

Since the competitiveness of a large part of the publishing industry depends on its ability to attract advertising and to sell additional editorial content (particularly digital content), since most publications are distributed on a printed medium, there is a need to access electronic editorial content directly from this printed medium.

However, the antagonism between owners of copyrighted works and consumers of these works has dramatically increased with the emergence of multimedia and electronic supports. Copyrighted works published on a printed media such as newspapers, books or magazines, are most of the time also available in an electronic format. In fact, with the growing use of digital information around the world, the distribution of copyrighted material represents a serious concern for publishers and authors.

Therefore, to facilitate the evolution towards "media-adaptive multimedia" in the publishing industry, there is a need to access directly from a printed document, additional information, in particular electronic information, while protecting the copyrights related to the distribution and commercialization of this additional information.

OBJECTS OF THE INVENTION

It is an object of the present invention to integrate printed objects, digital objects, multimedia objects while respecting the copyrights attached to these objects.

It is another object of the present invention to individually identify, select and retrieve the description and pricing information related to copyrighted edited objects referenced in the context of printed publications and for ordering, receiving and accessing said edited objects from these printed publications.

It is another object of the present invention to preserve the integrity of original printed publications and to avoid errors and mistakes due to the manual capture of codes printed on such publications to access additional copyrighted information.

SUMMARY OF THE INVENTION

The present invention discloses a system, method and computer program for selecting, ordering, accessing and displaying copyrighted information from physical documents such as printed publications or commercials. The invention allows the management and the direct sale from the editor to the final consumer of electronic information referenced on physical publications while respecting the copyrights attached to this electronic information. According to the present invention, a plurality of particular items (i.e., words, pictures, logos, etc.,) are defined on a physical document. These items are linked to copyrighted hardcopy or softcopy edited objets, such as chapters, notes, pictures, video or audio elements. For identifying and selecting the items defined in the physical document, these items are automatically illuminated by luminous signals (or light spots) generated by an opto-touch foil. The opto-touch foil operates under the control of a user workstation. An illuminated item is selected by the user by pressing the opto-touch foil over the illuminated position of this item. When the user selects a particular item among all illuminated items, the user workstation receives from the opto-touch foil a signal indicating the position of this selected item. The user workstation identifies and locates the edited object associated with the position of the selected item referring to an Edited Objects Table. If the user has already a license for the edited object, and if this edited object is already stored in the user workstation, then this edited object is accessed locally. If the user has no copyright for the edited object, a request is sent through a network to an Edited Objects server, to get a description and ordering information about the selected edited object. The edited object can then be downloaded and stored locally for a fee.

More particularly, the present invention, as defined in independent claims, is directed to a system, method and computer program for selecting, ordering, accessing edited objects from a physical document. The method, for use in a user system, comprises the steps of:

determining the position of a point selected on an light emitting foil, said light emitting foil being placed and aligned over or under a selected portion of a physical document, said portion comprising one or a plurality of items; each item corresponding to an illuminated position on said light emitting foil;

identifying the selected item corresponding to the position of the point selected on said light emitting foil referring to an edited objects table associated with said physical document; said edited objects table comprising an indication of the position of each item on the selected portion of the physical document;

identifying the one or plurality of edited objects associated with the selected item referring to the edited objects table, each item being associated with one or a plurality of edited objects in the edited objects table;

for each identified edited object:
  determining whether or not the user has a license to use or copy the edited object referring to the edited objects table:

if the user has no license to use or copy the edited object:
  sending an order for a license to an edited objects server;
  receiving the edited object with a license;
  storing said edited object;
  updating the edited objects table with means for accessing the edited object;
  indicating in the edited objects table that the user has a license to use or copy the edited object.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1 shows the main components of the invention.

FIG. 2 shows how the user, according to the present invention, enters, on the user workstation, the document number and accesses the document Edited Objects Table.

FIG. 3 shows an example of Edited Objects Table for a document, according to the present invention.

FIG. 4 shows how the user, according to the present invention, selects a page of a physical publication and places a transparent opto-touch foil over the selected page.

FIG. 5 shows how, according to the present invention, when the user enters a page number on the user workstation, the opto-touch foil illuminates printed items over the corresponding physical page.

FIG. 6 shows how the user, according to the present invention, presses with his finger the opto-touch foil over a selected illuminated printed item (e.g., Celtic gods).

FIG. 7 illustrates how, according to the present invention, when the user has already purchased a license of a digitally edited object, this edited object can be retrieved and displayed (or played) on the user workstation.

FIG. 8 shows how the user, according to the present invention, presses with his finger the opto-touch foil to select another illuminated printed item (e.g., Modron).

FIG. 9 illustrates how, according to the present invention, when a selected digitally edited object has not been purchased by the user, a request for information is sent to an Edited Objects server.

FIG. 10 shows how, according to the present invention, the user workstation receives from the Edited Objects server a description and a pricing and ordering information corresponding to the selected digitally edited object.

FIG. 11 illustrates how the user places an order for a selected digitally edited object, according to the present invention.

FIG. 12 shows how, according to the present invention, the requested digitally edited object is received from the Edited Objects server and stored on the user workstation.

FIG. 13 shows how, according to the present invention, when a requested digitally edited object is received, the Edited Objects Table of the physical publication is updated with the address (or URL—Uniform Resource Locator) of the edited object.

FIG. 14 shows how, according to the present invention, when the user selects a purchased edited object, this object is retrieved and is displayed (or played) on the user workstation.

FIG. 15 shows the principle of operation of a transparent opto-touch foil, used for selecting and retrieving digitally edited objects from a printed publication, according to the present invention.

FIG. 16 shows the steps of the method for selecting, ordering, retrieving, accessing and displaying copyrighted edited objects from printed publications and commercials, according to the present invention.

PREFERRED EMBODIMENT OF THE INVENTION

The present invention is directed to a method and system for managing the intellectual capital of published documents depending on the different modes of distribution or commercialisation. Such documents can be gathered in other published documents. For example, a book can contain chapters and/or notes or pictures which are sold separately. Such sale can be done using e-commerce or e-business sale and distribution systems. From a book exposed in a bookshop or any shop, a customer can separately buy a specific chapter, chart, picture, etc. . . Such separate document can be paid by whatever means, and can be sent through internet to one or several addresses provided by the customer, for instance:

to the own customer address;
to the address of another person (e.g., as a gift for a friend); or
to the address of a group of persons (e.g., for distributing documents to the employees of a company or to the students of an university).

Generally, the correspondence between external digital documents and physical documents uses techniques based on optical sensing and decoding of digital data where data is visibly encoded (e.g., by means of bar codes), or steganographically encoded on the physical document with techniques similar to these used for embedding watermarks or subliminal calibration patterns. Examples of this kind of systems can be found in the following patents:

U.S. Pat. No. 5,768,426 entitled "Graphics processing system employing embedded code signals" discloses a system where an identification code signal is impressed on a carrier to be identified (such as an electronic data signal or a physical medium) in a manner that permits the identification signal later to be discerned and the carrier thereby identified.

U.S. Pat. No. 6,311,214 entitled "Linking of computers based on optical sensing of digital data" discloses a system where a printed object, such as an item of postal mail, a book, printed advertising, a business card, or a product packaging, is steganographically encoded with plural-bit data. When such an object is presented to an optical sensor, the plural-bit data is decoded and used to establish a link to an internet address corresponding to that object.

Similarly, U.S. Pat. No. 6,408,331 entitled "Computer linking methods using encoded graphics" discloses a system and a method where a data object comprises both a graphic and embedded link information, such as the URL address of a network node, permitting the graphic object to serve as a link usable by an internet browser or the like.

U.S. Pat. No. 6,345,104 entitled "Digital watermarks and methods for security documents" deals with a system where security documents (e.g. passports, currency, event tickets, and the like) are encoded to convey machine-readable multi-bit binary information (e.g., a digital watermark), usually in a manner not alerting human viewers that such information is present. The documents can be provided with overt or subliminal calibration patterns. When a document incorporating such a pattern is scanned (e.g. by a photocopier), the pattern facilitates detection of the encoded information.

A commercial product for embedding a digital watermark in an image, and means of detecting it is the Digimarc® MediaBridge™, described on the web page of Digimarc, at http://www.digimarc.com/dmb/software.htm The systems and methods described in the herein above references have the common drawback of requiring the use of specialised encoding and printing techniques for embedding codes, patters or watermarks on printed materials. These techniques are not standard in the printing industry. In fact, the requirement consisting in modifying the original documents by printing coded information affects the integrity or even the readability of these documents and represents a fundamental drawback. Moreover, the end user must have a specialised interface such as a digital scanner or an optical sensor to locate, sense and decode embedded information from printed publications using these techniques.

A rather different approach for linking digital objects and printed objects is the DigitalDesk™ from Rank Xerox® EuroPARC, described in several technical documents published by Xerox and available on the web page: http://www.xrce.xerox.com/publis/cam-trs/html/. The idea behind DigitalDesk basically consists in "instead of making the computer act like a desk, make the desk act like a computer". To that aim, the DigitalDesk is built around an ordinary physical desk. It can be used as such, but it has extra capabilities. A video camera is mounted above the desk, pointing down at the work surface. The output of the camera is connected to a system that can recognize the documents that are placed on the surface of the desk and can detect where the user is pointing (using an LED-tipped pen). The more advanced version comprises a computer-driven projector mounted above the desk enabling electronic objects to be projected onto real paper documents—removing the burden of having to switch attention between screen and paper and allowing additional user-interaction techniques.

A main drawback of this system is the need of the use of bulky, static, non portable interface elements, such as a video camera and a projector over a desk. These elements are not usable on portable, mobile environments.

The present invention avoids the drawbacks of the herein above discussed systems. It provides a solution to associate physical documents with copyrighted digital documents in order to perform transactions while respecting the copyrights attached to these digital documents. Basically, the present invention:

allows the integration of the physical world (printed books) in the virtual world (electronic digitally coded information) and inversely. For instance, readers in a library can reference digital documents on printed documents or search for digital documents from printed documents.

allows the management and sale of digital documents referenced on physical documents, directly from the editor to the final consumer, while preserving the control of copyrights related to these digital documents.

allows the automatic capture, from a physical document, of information identifying copyrighted digital documents, which makes easier the management and the electronic commerce of such digital documents.

eliminates the manual capture of codes for identifying such digital documents when they are printed on paper and prevents errors and mistakes.

In a preferred embodiment, the system includes:

an opto-touch foil preferably transparent, placed by the user over (or under) a physical document or a portion of a physical document (preferably a publication or a page of a publication). This opto-touch foil is used:
- to illuminate and highlight items (preferably printed items) over the surface of the physical document, and
- to read coordinates of these items.

a user workstation for
- accessing edited objects related to items selected by the user on the physical document,
- placing orders for desired edited objects,
- storing the edited objects, and
- browsing the edited objects selected from the physical document.

a server acting primarily as repository for a plurality of edited objects and from which these edited objects can be downloaded by the consumer after payment.

Each item (i.e., words, pictures, logos, etc. ... printed on the publication) is linked to one or a plurality of copyrighted edited objets (i.e., chapters, notes, pictures, video or audio elements, hardcopy or softcopy). For identifying and selecting said items, they are automatically illuminated by means of a luminous signal (or light spot) generated by the opto-touch foil. The opto-touch foil operates under the control of the user workstation. Illuminated items are selected by the user by pressing the opto-touch foil. When the user selects an item among all illuminated items, the user workstation receives from the opto-touch foil a signal indicating the position of this selected item. The user workstation identifies and locates referring to an Edited Objects Table, the edited object associated with the position of the selected item.

If the user has a license to copy and use the edited object and if the edited object is already stored in his workstation, then this edited object is accessed locally.

If the user has no copyright concerning the edited object, a request is sent through a network to an Edited Objects server, to get a description of the edited object with ordering information.

In a preferred embodiment, the user workstation is connected to the Internet network and comprises a Web Browser application. In a particular embodiment, the opto-touch foil is built by stacking a transparent resistive or capacitive film, of the type commonly used to manufacture touch screens over a transparent organic light emitting device film (TOLED film).

System for Selecting, Ordering, Retrieving, Accessing and Displaying Copyrighted Edited Objects from Physical Documents As shown in FIG. 1, the system according to the present invention comprises:
- a physical document (100) preferably a printed publication (e.g., a printed book, a catalog) comprising one or a plurality of pages;
- a physical document interface made of a transparent opto-touch foil (101);
- a user workstation (103), connected (104) to the opto-touch foil interface (101), and to a communication network (105) (e.g., the Internet);
- an Edited Objects server (106).

Physical Publication

The physical document (100) can be any kind of publication, for example, a newspaper, a geographic map, a novel book, a text book, a technical book, a commercial catalog or even any other type of publication, comprising items, preferably printed items such as words, phrases, logos, or pictures, related to copyrighted or licensed edited objects, such as publications, CDs (Compact Discs), DVDs (Digital Video Discs), high quality pictures, computer software or any other types of hardcopy of softcopy documents which are sold separately from the physical document or publication.

Opto-Touch Foil

The opto-touch foil (101) comprises two, functionally independent, transparent foils, namely:
- a touch foil, and
- a light emitting foil (opto foil).

FIG. 15 shows the cross section of an opto-touch foil (1500). This opto-touch foil comprises:
- a transparent resistive or capacitive touch foil (1501), of the type used commonly to manufacture touch screens. The generated signal is generally proportional to the coordinates of the point that is pressed or touched (1503), One example of touch foil technology it would be possible to use, is the TouchTek4 (4-wire Analog Resistive Touchscreens) of MICRO TOUCH company (TouchTek™ is a trademark of the MICRO TOUCH Company). The TouchTeck4 technology is fully described in the Web site of MICRO TOUCH Company at
    http://www.microtouch.com/.
- a transparent light emitting foil (1502), which is a transparent, bright, self-emitting display that can emit light (1504) from either one or both surfaces. The light emitting foil may be made of an array of TOLED's (Transparent Organic Light Emitting Devices), of the type used today to create vision area displays on windshields, cockpits, helmets and eyeglasses. TOLED displays, which can be up to 85% transparent when not energized are today manufactured with standard silicon semiconductors. One example of light emitting foil technology it would be possible to use is the technology used for the TOLEDs manufactured by UNIVERSAL DISPLAY CORPORATION. The TOLED technology is fully described in the Web site of UNIVERSAL DISPLAY CORPORATION at
    http://www.universaldisplay.com/toled.html.

The combination of both foils (i.e., the touch foil stacked over the light emitting foil) forms an opto-touch foil (1500). FIG. 15 represents an opto-touch foil (1500) placed and aligned over a physical publication (1505) comprising a plurality of items (1506) (i.e., words, pictures, icons, etc.) printed (or written, painted, engraved ... ) on its surface.

The opto-touch foil (101), (1500) may communicate with the user workstation over an infrared link, a wired connection or any other communication means (e.g. by means of a wireless connection operating in the globally available 2.4 Ghz band of the "Bluetooth" specification, as promoted by the "Bluetooth Special Interest Group". and documented on the Official Bluetooth Website http://www.bluetooth.com/).

User Workstation

The user workstation (103) is used:
- to get information about copyrighted edited objects selected by the user on the physical document (100),
- to order desired edited objects to the editor or publisher,
- to retrieve desired edited objects from an Edited Objects server (106) connected to the communication network (105) (e.g., the internet network),
- to store the retrieved edited objects;
- to browse the retrieved edited objects from the physical document (100).

The user workstation (103) may be, for example, an Internet enabled cell phone, an Internet appliance, a multimedia Personal Computer (PC), a set-top box, a WebTV, a game console or a wireless IP enabled device.

Edited Objects Server

The Edited Objects server (106) primarily, is the repository where licensed or copyrighted edited objects files, accessible from a plurality of physical documents (or publications), are stored and from where they can be accessed and downloaded by customers for a fee. Also, the Edited Objects server provides the customers with descriptions and ordering information related to edited objects selected from physical documents (or publications).

Method for Selecting, Ordering, Retrieving, Accessing and Displaying Copyrighted Edited Objects from Physical Documents As shown in FIG. 16, the present invention discloses a system, method and computer program for selecting, ordering, retrieving, accessing and displaying copyrighted edited objects from physical documents (preferably printed publications) and commercials (like the document shown in FIG. 1 entitled "*Early British Kingdoms*"). The method comprises the steps of:
- (1601) identifying (204), (205) a physical document (200), said physical document comprising one or a plurality of pages (or portions);
- (1602) identifying a page (or portion) (504), (506) of said physical document, said page comprising one or a plurality of printed items (505); each printed item being associated with one or a plurality of edited objects in an Edited Objects Table associated with said identified physical document (303);
- (1603) identifying the positions (311) of these printed items (312) comprised on said identified page (320) referring to the Edited Objects Table (300), said Edited Objects Table comprising for each page (320) of the document, a list of printed items (312), and for each printed item, an indication of its position (311) on said page;
- (1604) sending for illumination on an opto-touch foil (501), the position of said printed items (505), said opto-touch foil being connected to a user workstation (503).
- (1605) placing and aligning (404) the opto-touch foil (401) over the selected page (406) of the document;

The method comprises the further steps of:
- (1606) determining the position of a point pressed (602) on said opto-touch foil (601); each printed item (604) on said page corresponding to a illuminated position on said opto-touch foil; said opto-touch foil being pressed (602) at a point corresponding to a selected printed item (605);
- (1607) identifying the selected item (605) corresponding to the position of the point pressed (602) on said opto-touch foil (601) referring to the Edited Objects Table (300), said table comprising an indication of the position (311) of each printed item (312) on the identified page (320);
- (1608) checking for each edited object corresponding to a selected item (605), if there is a file path (313) on the user workstation (603) referring to the Edited Objects Table (300), said table comprising for each edited object stored on the user workstation, an identification (312) and means (preferably a file path) (313) to access the edited object on the user workstation (603).
  - if there is a file path (313) to access the selected edited object on the user workstation (603):
    - (1609) accessing said edited object (706) on the user workstation (703) by means of said file path (313), (707), and displaying or playing said edited object (706) on the user workstation;
  - if there is no file path (313) to access the selected edited object (805) on the user workstation (803):
    - (1610) sending to an Edited Objects server (908), a request (906) for information (including copyrights or licensing terms and conditions, pricing and ordering information) about the selected item (905), said information request (906) comprising an identification of:
      the physical document (303),
      the page (320), and
      the selected item (312), (905);
    - (1611) receiving on the user workstation (1003), the requested information (1009) related to the selected item (1005) from the Edited Objects server (1008), and displaying said information on the user workstation;
    - (1612) browsing the information (1009) related to selected item (1005), and optionally sending an order (1106) to the Edited Objects server (1108) to purchase a license to download the edited object (1209), said order comprising the identification of:
      the selected physical document (303),
      the page (320),
      the selected item (312), and
      payment data (1110), (1111) required by the publisher;
    - (1613) receiving (1206) the ordered edited object (1209) from the Edited Objects server (1208);
    storing and installing said edited object on the user workstation (1203);
    - (1614) identifying into the Edited Objects Table (1300), the file path (1302) to the received and installed edited object, said table comprising for each edited object stored on the user workstation, the identification (1301) and file path (1302) on the user workstation to said owned edited object.

FIG. 2 shows how the user selects a physical document (or publication) (200) (e.g., a printed book entitled "*Early British Kingdoms*"). By means of any user interface (keyboard, mouse, . . . ) or any other reading means (e.g., bar code reader . . . ), the user enters the reference number (identifier) (204) of the document. In the particular embodiment shown in FIG. 2, the user enters (205) by means of the keyboard of his workstation (203), the reference number (204) of the document (e.g.: Pub: 170301). This procedure gives access to an Edited objects Table (206) associated with the selected publication (200). This table has been previously stored in the user workstation (203). In a preferred embodiment of the invention, the user downloads from the Edited Objects server (106), a copy of the Edited objects Table (206) associated with the document (200) The URL (207) (e.g.: http://www.virgin.net/) of the Edited Objects server (106) from which the Edited objects Table (206) can be retrieved, must be provided by the book seller or the editor. Alternatively, as illustrated on FIG. 2, this URL may be printed (207) on the physical document (200).

FIG. 3 shows an example of Edited objects Table (300) associated with a publication (200). The header section (301) of the table comprises:
the URL (302), (207) of the Edited Objects server (106) (e.g.: http://www.virgin.net/), from where the Edited objects Table (300) of the publication (200) can be retrieved and stored in the user workstation (203);
the publication number (303), (e.g.: Pub.: 170301), and
other relevant information related to the physical publication (200) such as
the title (304) (e.g., "*Early British Kingdoms*"), the author's name (305) (e.g., "David Nash Ford of Binfield, Berkshire, UK"), the date of the publication (306) (e.g., "28, Jan. 1999"), the ISBN (International Standard Book Number) (307) (e.g., "84-344-0856-2"), etc.

This example shows also the structure of the body section (310) of the Edited Objects Table (300). Basically, with each page (320) of the physical publication (200), is associated a group of entries (330) on the Edited objects Table (300). Each entry of this group corresponds to a different edited object, referenced on the page by a particular printed item. In particular, for each edited object, three fields are defined in the Edited Objects Table, namely:

the position of the printed item on the page (311);

the name of the printed item (312); and the means (the file path) to access the edited object (313).

The information comprised in these fields is used:

to determine the position (311), on the page (320), of each printed item, and to highlight the positions of said printed items by means of the opto-touch foil (201). The opto-touch foil is placed and aligned over or under the identified page of the physical publication (200). Each printed item on the page corresponds to a highlighted position on said opto-touch foil. The opto-touch foil is pressed by the user at a point corresponding to a selected printed item;

to identify the name (312) of the selected printed item corresponding to the position of the point pointed by the user on said opto-touch foil (201) referring to the Edited Objects Table (300), said table comprising an indication of the position (311) on the identified page of each printed item;

to identify and locate the edited object (313) associated with the selected printed item (312) referring to the Edited objects Table (300), said table comprising for each printed item of each page of the document the identification and location of the edited object (313) associated with the printed item (312);

to access and display on the user workstation the edited object (313) associated with the selected printed item (312).

FIG. 4 shows how the user selects a page (406) (e.g., Page 115) of the physical document (or publication) (400) and places the transparent opto-touch foil (401) over it, aligning the borders of the opto-touch foil and the document by some conventional means (404) (e.g., by adjusting the upper left corner of the opto-touch foil with the upper left corner of the publication's page).

FIG. 5 shows how the user, by means of any user interface (keyboard, mouse, . . . ) or any reading means (bar code reader . . . ) enters (506) on the user workstation (503) the page number (504) of the physical document (500) (e.g.: Page 115) he wants to select. After identification of the page number (320), the page coordinates (X, Y) (311) of the items (330) (e.g., "Celtic gods", "Avalon", "Modron", "Arthur") defined for this page (320), are retrieved from the Edited objects Table (300) on the user workstation (503). The items are highlighted by the opto-touch foil (501) over the publication's page by light spots (505) illuminated at those coordinates.

FIG. 6 shows how the user identifies and selects a printed item (605) on a page (504) of a physical publication (600) by pressing with a finger (602) over (or near) the light spot emitted by the opto-touch foil (601) over (or near) said printed item. By means of this action, using the opto-touch foil coordinates (e.g., X=32; Y=97) of the point being pressed (602), the selected item (605) (e.g., "Celtic gods") is identified in the Edited objects Table (300), (e.g., by computing the minimum distance from measured opto-touch foil coordinates (X=32; Y=97) to the coordinates (311) of all printed items (312) defined for this page (320) on the Edited objects Table (300)). The path (313) to the edited object file associated with the selected item (605) is identified using the Edited objects Table. In the example illustrated in FIG. 6, the file path to the edited object (313) corresponding to the selected printed item ("eltic gods") is:

c:\170301\115\celtic-gods.html

FIG. 7 illustrates how, when the edited object associated with the selected printed item (312) (705) (605) (e.g., "Celtic gods") is stored in the user workstation (703) (i.e., when a license has been purchased by the user, and the edited object has been downloaded from the Edited Objects server (106) and installed on the user workstation), the file path (313) associated with this edited object (312) can be found in the Edited objects Table (300). In the present example, the selected edited object HTML file (706) "celtic-gods.html" is directly retrieved from the local storage of the workstation (703) using the edited object file path (707): "c:\170301\115\celtic-gods.html" stored in the Edited objects Table (300). The HTML file is then displayed (706) to the user.

FIG. 8 illustrates the case when the user selects a printed item corresponding to a copyrighted edited object (805) for which he has no copyright or license. This edited object is available on the Edited Objects server (106), but has still not been downloaded onto the user workstation (803). As shown in FIG. 8, the user touches with his finger (802) the opto-touch foil (801) over another printed item (805) (e.g., "Modron") printed on the physical publication (800). As before, by means of this action, the selected item (312) (i.e., "Modron") is identified on the Edited objects Table (300), but in this case, the associated edited object file path (313) cannot be found (i.e., "Editorial_object_not_found") in the table. A warning message (806) (e.g., "Object not found") is displayed on the user workstation (803) to indicate that the selected item (805) corresponds to a copyrighted edited object subject to a fee. The user can optionally purchase a license to copy the edited object (or take a license) from the publisher or editor.

FIG. 9 shows how, in the case illustrated in FIG. 8, when the user has not purchased any copyright related to the edited object associated with the selected item (905) (e.g., "Modron") and when the edited object has not been downloaded from the Edited Objects server (908) onto the user workstation (903), a request for additional information (906) about the edited object associated with the selected item, is automatically sent through the communications network (907) from the user workstation (903) to the Edited Objects server (908). In the example shown in FIG. 9, the transaction:

http://www.virgin.net/
   ?&doc=170301&page=115&object="Modron"

including:

a reference to the URL (302) (e.g: www.virgin.net) of the Edited Objects server (908) (extracted from the header (301) of the Edited Objects Table (300) of the publication), the publication number (303) (e.g., 170301), (also extracted from the same header (301) of the Edited objects Table (300) of the publication), the selected page number (320), (910) (e.g., 115), and the name selected item name (312), (905) (e.g., "Modron")

is sent from the user workstation (903) to the Edited Objects server (908) (i.e., to: www.virgin.net).

FIG. 10 shows how, when the Edited Objects server (908), (1008) receives a request (906) for information about an edited object associated with a particular printed item (905) referenced on a page (910) of a publication (909), the description and the ordering or purchasing information (1006) of this edited object are retrieved from a publications database located on the Edited Objects server (1008) and sent to the user workstation (1003). In the example shown in FIG. 10, the reply to the request (906) for information concerning the printed item "Modron" referenced on page 115 of publication number 170301 comprises the description and ordering file named modron-info.html located at URL (1006):
http://www.virgin.net/170301/115/modron-info.html on the Edited Objects server (1008) www.virgin.net. This file is retrieved and displayed (1009) using a browser program installed on the user workstation (1003).

FIG. 11 shows how, if, after reading the description and ordering information (1009) about a copyrighted edited object associated with a selected item (e.g., "Modron") printed on a physical publication, the user decides to order this edited object, an electronic form (1109) is filled and sent to the Edited Objects server (1108). In the illustrative example shown in FIG. 11, a purchase transaction:
http://www.virgin.net/?&doc=170301&page=115&object= "Modron"&account=5558397&pin=XXXX identifying:
the publication number (303) (e.g., 170301),
the page number (320) (e.g., 115),
the name of the selected printed item (312) (e.g., "Modron"),
the customer account number (1110) (e.g., 5558397) and
the PIN number (1111) (e.g., XXXX), required to bill the order, is sent from the user workstation (1103) to the Edited Objects server (1108) (i.e., to: www.virgin.net).

FIG. 12 illustrates how, once the user has placed an order to access the copyrighted edited object corresponding to the selected printed item (312) (e.g., "Modron"), in the case the Edited Objects server (1208) validates and accepts the transaction (1106), the requested edited object is retrieved from a repository comprising a plurality of edited objects and is downloaded through the network (1207) from the Edited Objects server (1208) to the user workstation (1203). In the example shown in FIG. 12, the edited object file Modron.doc, is retrieved from the Edited Objects server (1208) using the URL (1206):
http://www.virgin.net/170301/115/Modron.doc and is downloaded and stored on the user workstation (1203) with the file path (1209):
c:\170301\115\Modron.doc.

FIG. 13 shows how, when the file of the purchased edited object (1206) (e.g., Modron.doc) corresponding to the printed item selected by the user (1205) (e.g., "Modron"), is downloaded from the Edited Objects server (1208) onto the user workstation (1203), the file path to access the edited object file when this file is installed on the user workstation (1209) (e.g., c:\170301\115\Modron.doc), is recorded in the file path field (1302) corresponding to the ordered edited object (1301) in the Edited Objects Table (1300) of the publication.

FIG. 14 illustrates how, once the requested edited object corresponding to the selected item (e.g., "Modron") has been received and stored in the user workstation (1403) (i.e., after purchase of a license to copy the edited object), each time the user selects (1402) this item printed on the physical publication (1400), the corresponding edited object is retrieved from the local storage of the user workstation and displayed on the user workstation. In the example shown in FIG. 14, when the user touches (1402) the light spot emitted by the opto-touch foil (1401) over (or near) the printed word (1405) "Modron", the edited object file "Modron.doc" is retrieved from the local storage, using the file path (1302), (1406): c:\170301\115\Modron.doc recorded in the Edited Objects Table (1300). The retrieved file is displayed on the user workstation (1403).

What has been described is merely illustrative of the application of the principles of the present invention. Other arrangements and methods can be implemented by those skilled in the art without departing from the spirit and scope of the present invention.

What is claimed is:

1. A method for processing edited objects associated with a copyrighted physical document, the method for use in a user workstation by a user, said method comprising the computer-implemented steps of:

determining a position of a point pressed on a touch foil of an opto-touch foil aligned over or under a page of the copyrighted physical document, said page comprising a plurality of items, said point having been pressed to select an item of the plurality of items during illumination of the plurality of items by a light emitting foil of the opto-touch foil, said pressed point aligned proximate to the selected item;

identifying the selected item by correlating the determined position of the pressed point with a position of the selected item in a list of item positions recorded in an item position column of an edited objects table that is stored in the user workstation, said list of item positions being associated with the plurality of items on the page of the physical document, wherein the edited objects table comprises a header section and a body section, wherein the header section comprises a Uniform Resource Locator (URL) of an edited objects server, a publication number of the physical document, a title of the physical document, an author of the physical document, a date of publication of the physical document, and an International Standard Book Number (ISBN) of the physical document, wherein the body section comprises a plurality of rows and three columns, wherein each row of the plurality of rows is specific to a copyrighted edited object, wherein the three columns consist of the item position column comprising a position of the edited object on the page, an item name column comprising a name of the edited object, and an edited object path column comprising either a file path to the edited object on the user workstation which denotes that the user has a license to use and or copy the edited object or informing text indicating that the edited object does not exist on the user workstation which denotes that the user does not have the license to use and/or copy the edited object, wherein the edited object path column for at least one row of the plurality of rows comprises the file path to the edited object specific to each row of the at least one row, and wherein the edited object path column for each row of at least one other row of the plurality of rows comprises the informing text;

identifying a first edited object in the edited objects table from an edited object name denoted in the item name column in a determined row of the edited objects table in which there is an association of the first edited object with the selected item resulting from said correlating;

ascertaining, from the informing text in the edited object path column of the determined row, that the user does not have a license to use and or copy the first edited object;

after said ascertaining, sending, from the user workstation to the edited objects server, a request for information concerning the first edited object, wherein the request comprises an identification of the physical document, an identification of the page, and an identification of the selected item;

receiving, by the user workstation from the edited objects server, the requested information, wherein the received requested information comprises license terms and conditions as well as pricing and ordering information pertaining to the first edited object;

after said receiving the requested information, displaying or playing the received requested information on the user workstation;

after said displaying or playing the received requested information, sending an order from the user workstation to the edited objects server for the license, wherein the order comprises the identification of the physical document, the page, and the selected item, and payment data relating to the selected item and required by a publisher of the physical document;

after said sending the order, receiving, by the user workstation from the edited objects server, the first edited object with the license;

storing the received first edited object in the user workstation;

updating the edited object path column in the edited objects table in the user workstation with a file path for accessing the stored received first edited object.

2. A method for processing edited objects associated with a copyrighted physical document, the method for use in a user workstation by a user, said method comprising the computer-implemented steps of:

determining a position of a point pressed on a touch foil of an opto-touch foil aligned over or under a portion of the copyrighted physical document, said portion comprising a plurality of items, said point having been pressed to select an item of the plurality of items during illumination of the plurality of items by a light emitting foil of the opto-touch foil, said pressed point aligned proximate to the selected item;

identifying the selected item by correlating the determined position of the pressed point with a position of the selected item in a list of item positions recorded in an edited objects table that is stored in the user workstation, said list of item positions being associated with the plurality of items on the portion of the physical document;

identifying an edited object in the edited objects table from association of the edited object with the selected item in the edited objects table;

ascertaining whether the user has a license to use and or copy the edited object; and if said ascertaining ascertains that the user has the license then accessing the edited object from the user workstation and displaying the edited object, and if said ascertaining ascertains that the user does not have the license then obtaining the license and the edited object from an edited objects server, wherein said ascertaining ascertains that the user does not have the license, and wherein said obtaining the license and the edited object from the edited objects server comprises:

sending an order for the license to the edited objects server;

receiving the edited object with the license from the edited objects server;

storing the edited object in the user workstation;

updating the edited objects table with a file path for accessing the stored edited object;

indicating in the edited objects table that the user has the license, wherein said sending the order for the license to the edited objects server comprises sending to the edited objects server a request for information concerning the edited object, and wherein the method further comprises:

receiving the requested information from the edited objects server; and displaying or playing the received information concerning the edited object, wherein the physical document is a printed document comprising at least one page, and wherein the portion of the physical document is a page of the at least one page, and wherein the requested information comprises:

license terms and conditions;

pricing and ordering information; and an identification of the physical document, the page, and the selected item.

3. A method for processing edited objects associated with a copyrighted physical document, the method for use in a user workstation by a user, said method comprising the computer-implemented steps of:

determining a position of a point pressed on a touch foil of an opto-touch foil aligned over or under a portion of the copyrighted physical document, said portion comprising a plurality of items, said point having been pressed to select an item of the plurality of items during illumination of the plurality of items by a light emitting foil of the opto-touch foil, said pressed point aligned proximate to the selected item;

identifying the selected item by correlating the determined position of the pressed point with a position of the selected item in a list of item positions recorded in an edited objects table that is stored in the user workstation, said list of item positions being associated with the plurality of items on the portion of the physical document;

identifying an edited object in the edited objects table from association of the edited object with the selected item in the edited objects table;

ascertaining whether the user has a license to use and/or copy the edited object; and if said ascertaining ascertains that the user has the license then accessing the edited object from the user workstation and displaying the edited object, and if said ascertaining ascertains that the user does nor have the license then obtaining the license and the edited object from an edited objects server, wherein said ascertaining ascertains that the user does not have the license, and wherein said obtaining the license and the edited object from the edited objects server comprises:

sending an order for the license to the edited objects server;

receiving the edited object with the license from the edited objects server;

storing the edited object in the user workstation;

updating the edited objects table with a file path for accessing the stored edited object;

indicating in the edited objects table that the user has the license, wherein the edited objects table comprises rows and columns, wherein each row is associated with a unique edited object, and wherein the columns comprise a column for item position, a column for item name, and a column for the file path for accessing the edited object.

* * * * *